United States Patent
Griffiths

(10) Patent No.: US 9,654,566 B2
(45) Date of Patent: *May 16, 2017

(54) EVENT QUEUING AND DISTRIBUTION SYSTEM

(71) Applicant: Rackspace US, Inc., San Antonio, TX (US)

(72) Inventor: Kurt Evan Griffiths, Dacula, GA (US)

(73) Assignee: Rackspace US, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/279,098

(22) Filed: May 15, 2014

(65) Prior Publication Data

US 2014/0280852 A1    Sep. 18, 2014

Related U.S. Application Data

(63) Continuation of application No. 13/094,905, filed on Apr. 27, 2011, now Pat. No. 8,751,639.

(51) Int. Cl.
| | |
|---|---|
| *G06F 15/16* | (2006.01) |
| *H04L 29/08* | (2006.01) |
| *G06F 17/30* | (2006.01) |
| *G06F 9/54* | (2006.01) |

(52) U.S. Cl.
CPC ............ *H04L 67/141* (2013.01); *G06F 9/542* (2013.01); *G06F 17/30194* (2013.01); *G06F 2209/548* (2013.01)

(58) Field of Classification Search
CPC ... H04L 67/141; H04L 65/60; H04S 2400/01; G06F 9/542; G06F 15/16

USPC ................. 709/201, 224, 228; 370/252, 329
See application file for complete search history.

(56) References Cited

U.S. PATENT DOCUMENTS

| | | | |
|---|---|---|---|
| 6,351,213 B1 | 2/2002 | Hirsch | |
| 6,728,688 B1 | 4/2004 | Hirsch et al. | |
| 7,260,598 B1* | 8/2007 | Liskov | H04L 45/306 709/201 |
| 7,457,872 B2 | 11/2008 | Aton et al. | |
| 7,466,705 B2 | 12/2008 | Saito et al. | |
| 7,574,528 B2 | 8/2009 | Day | |
| 7,958,104 B2 | 6/2011 | O'Donnell | |
| 2004/0196482 A1 | 10/2004 | Kurita | |
| 2005/0013257 A1* | 1/2005 | Garyfalos | G06F 9/542 370/252 |
| 2005/0138111 A1* | 6/2005 | Aton | G06F 11/3476 709/201 |
| 2005/0182843 A1* | 8/2005 | Reistad | H04L 43/0817 709/230 |
| 2006/0085243 A1* | 4/2006 | Cooper et al. | 705/8 |

(Continued)

*Primary Examiner* — Tesfay Yohannes
(74) *Attorney, Agent, or Firm* — Dykema Gossett P.L.L.C.

(57) ABSTRACT

A REST-based event distribution system is described, with particular applicability to the distribution of distributed filesystem notifications over a high-latency best-effort network such as the Internet. In one embodiment, event channels are mapped to URL spaces and created and distributed through the use of HTTP POST and GET requests. The system is optimized for short polling by clients; an event history is maintained to buffer messages and maintain the idempotence of requests. In another embodiment, the events are registered as a SIP event pack allowing for the distribution of filesystem events.

17 Claims, 11 Drawing Sheets

(56) References Cited

U.S. PATENT DOCUMENTS

| | | | |
|---|---|---|---|
| 2007/0183767 A1* | 8/2007 | Kasai | G03B 17/00 396/56 |
| 2007/0239537 A1 | 10/2007 | Protheroe et al. | |
| 2007/0239639 A1* | 10/2007 | Loughmiller | G06Q 10/107 706/20 |
| 2008/0020771 A1* | 1/2008 | Trayer | 455/439 |
| 2008/0183058 A1* | 7/2008 | Mannheimer | A61B 5/02455 600/323 |
| 2009/0323608 A1* | 12/2009 | Adachi et al. | 370/329 |
| 2010/0115112 A1* | 5/2010 | Oh et al. | 709/228 |
| 2010/0146638 A1* | 6/2010 | Siourthas | G06Q 20/04 726/28 |
| 2010/0205290 A1* | 8/2010 | Peng et al. | 709/223 |
| 2010/0262434 A1 | 10/2010 | Shaya | |
| 2011/0289102 A1* | 11/2011 | Pearson | G06Q 20/14 707/769 |
| 2012/0054440 A1* | 3/2012 | Doig | G06F 17/30902 711/122 |
| 2012/0122067 A1* | 5/2012 | Dohring | G09B 7/02 434/322 |
| 2012/0158888 A1* | 6/2012 | Rance | G06F 17/3089 709/217 |
| 2012/0179478 A1 | 7/2012 | Ross | |

* cited by examiner

EVENT QUEUING AND DISTRIBUTION SYSTEM

The present application is a continuation application of and claims priority to U.S. patent application Ser. No. 13/094,905 filed Apr. 27, 2011, entitled "Event Queuing and Distribution System", which is incorporated herein by reference.

BACKGROUND

The present disclosure relates generally to event queuing, and more particularly to a scalable event distribution system useful in a variety of computer contexts.

Event distribution is a common problem in network computing environments. Network nodes often need to communicate information to other network nodes. One solution is for each node in the network to be directly connected to every other node, and to send events itself to the other nodes. This approach becomes extremely complex with even a relatively small number of nodes, as the number of connections grows exponentially. The amount of management necessary to account for nodes joining and leaving the network is far from trivial. Many products and standards attempt to solve this problem by providing an event service. Typical event services include a centralized manager (or a management protocol) and one or more named channels. Communications happen asynchronously by putting events into the channel; threads or applications that want to receive events "listen" for events and receive them from the channel.

Typical event services are of one of two types: a queue or a pipe. A queue-based event service holds information in storage until it is read by one of a number of clients. When a client confirms that the information has been appropriately read or processed, the event is removed from the queue. These queue-based event services are typically used to coordinate work among a number of possible readers and writers when processing is happening asynchronously, such as in a mapreduce-based processing system.

In contrast, pipe-based event services typically do not record the events as they occur. A pipe-based system works like plumbing: when a particular channel is open, then events will flow to their destinations as quickly as possible, with different systems providing guarantees such as guaranteed delivery or in-order delivery. Events do not stay in the channel until they are claimed by an endpoint; if there is no reader ready to receive the event, then the event is discarded. Pipe-based event services are typically used to coordinate real-time or high-volume work, such as in a real-time operating system.

Existing event services include various implementations using the Advanced Message Queuing Protocol (AMQP). AMQP is an open application layer protocol for message queuing that defines the interaction between the client and a server or broker. The protocol defines message, exchanges for accessing and storing messages on various types of queues. The protocol also allows the client and server to define custom behaviors for the queue, such as message generation, message persistence, and message routing. Example implementations of the AMQP protocol include RabbitMQ and Apache Qpld.

Other existing event services may use the Extensible Message and Presence Protocol (XMPP). XMPP is an open protocol commonly used in instant messaging applications such as Google Talk and Facebook chat. The protocol involves one client sending an event to an associated server. The event contains addressing information for a destination client. The server examines this information and sends the event to the server associated with the destination client. If the destination client is online, the message is delivered. If the client is offline, the message is stored for later delivery. XMPP has also been used as a message delivery service.

Finally, PubSubHubbub (PuSH) is an open protocol for distributed event publishing an subscription. Based on Atom, PuSH aims to provide real-time change notifications without a client having to poll a server. PuSH uses long-polling in HTTP, which can use up available resources as the number of clients grows.

The following disclosure describes several embodiments of alternate solutions to the problem described above, some of which leverage, include, combine or modify the products and standard listed above.

SUMMARY

A REST-based event distribution system is described, with particular applicability to the distribution of distributed filesystem notifications over a high-latency best-effort network such as the Internet. In one embodiment, event channels are mapped to URL spaces and created and distributed through the use of HTTP POST and GET requests. The system is optimized for short polling by clients; an event history is maintained to buffer messages and maintain the idempotence of requests. In another embodiment, the events are registered as a SIP event pack allowing for the distribution of filesystem events. A REST-based event distribution system is described, with particular applicability to the distribution of distributed filesystem notifications over a high-latency best-effort network such as the Internet. In one embodiment, event channels are mapped to URL spaces and created and distributed through the use of HTTP POST and GET requests. The system is optimized for short polling by clients; an event history is maintained to buffer messages and maintain the idempotence of requests. In another embodiment, the events are registered as a SIP event pack allowing for the distribution of filesystem events.

According to one embodiment, the system comprises a server configured to respond to event requests via a synchronous client-server protocol, where the server further includes a backing store configured to store an event associated with a first channel identifier and to allow subsequent retrieval of the event using the same channel identifier, a communications module operable to receive event requests and send responses; an event filtering system operable to evaluate, modify, and block event requests and responses, and an event manager coordinating the use of the backing store, communications module, and event filtering system.

According to another embodiment, the event system performs a method comprising receiving at a server an event publishing request, the event publishing request including an event publishing verb and a first subject, wherein the verb describes the requested publishing action, and wherein the first subject includes a first event, the event further including a first channel identifier, a first resource identifier and a first associated action; receiving a first event notification request, the first event notification request including the first channel identifier; performing at the server a first filtering operation to obtain a first filtering result; if indicated by the first filtering result, sending a first response, the first response including a representation of the first event, the representation of the first event including the first resource identifier and a representation of the first associated action; receiving a second event notification request, the second event notification request including the first channel identifier; performing at the server a second filtering operation to obtain a second filtering result; if indicated by the second filtering result, sending a second response including a representation of the first event, wherein the representation of the first event in the second response is substantially identical to the first response. The requests and responses can be used to provide intelligent filtering and notification behavior to clients.

According to another embodiment, a non-transient computer readable medium contains executable instructions, which when executed on a processor, receive at a server a request formatted according to a client-server protocol, the request addressed to a channel identifier and including a set of parameters and evaluate the parameters to determine a response. In a first possible response, the parameters are interpreted to define a new event, and the executable instructions are operable to store a representation of the event parameters on a computer-readable medium and return a response indicating successful storage of the event; In a second possible response, the parameters are interpreted to refer to an existing event, and the executable instructions are operable to load a representation of the existing event, and include a representation of the event in a response; and in a third possible response, the parameters are interpreted to refer to an nonexisting event, and the executable instructions are operable to send an empty response.

In various embodiments, the event requests represent interactions with a distributed filesystem storage system.

DETAILED DESCRIPTION

Figure 1:
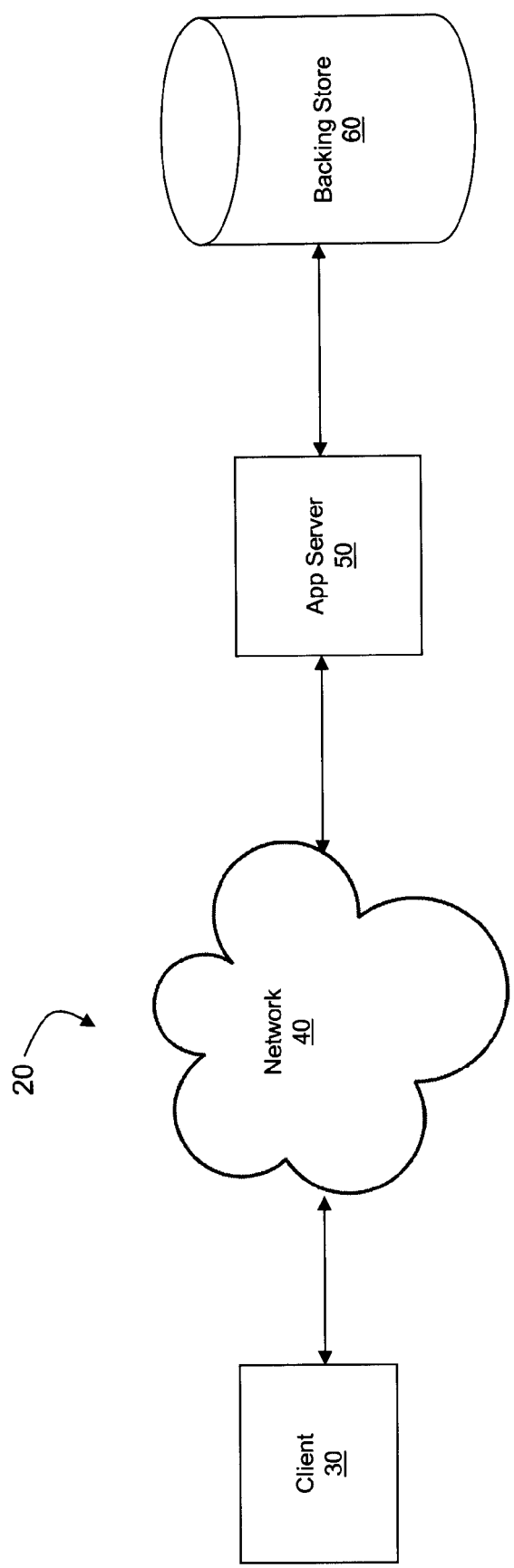
FIG. 1 is a schematic view illustrating an embodiment of an event queuing and distribution system according to various aspects of the present disclosure.

Generally, the present disclosure relates to a scalable system for event queuing and distribution. In an embodiment, the system achieves this type of scalability by employing a RESTful architecture. REST stands for "Representation State Transfer" and is an architecture for distributed systems. In a RESTful architecture, each response from a server contains a "representation" of a resource identified in a client request. Each representation returned places the client in a different state, thus the name "representational state transfer."

REST defines several constraints a "RESTful" architecture must follow: 1) The architecture must follow a client-server model. 2) No client state can be stored by the server, meaning the client keeps track of its own session state. This requires that each request from the client contains all the information necessary to process the request. 3) Responses must be cacheable. This constraint does not require that the same request always produce the same response, but that the server marks individual responses as cacheable or non-cacheable so the client can know when it can cache a response without risk of reusing stale data. 4) The architecture must allow for layering of components. A client should not be able to tell whether it is connected directly to the end server or to an intermediary server. This allows for load balancing and caching schemes. 5) The architecture must employ a uniform interface between servers and clients. This final constraint has 4 guiding principles for a uniform interface: the Interface must provide identification of resources, must allow the resources to be manipulated through these representations, the messages sent between the client and server should be self-descriptive, and that hypermedia should be the engine of the applications state. One prominent example of a RESTful system is the World Wide Web. Clients (e.g., web browsers) send HTIP requests to web servers requesting resources defined by URLs. The server returns a representation of the resource, for example an HTML page or XML document, that Is then rendered by the client, placing it in a new state.

In a preferred embodiment, the present system uses a RESTful architecture to provide a scalable event queuing system. Events In this embodiment are organized into channels or queues. Clients wishing to receive events request all events from a certain channel and provide certain restrictions on which events they want to receive. For example, in the first embodiment, a client providing an identifier representing the last event it has seen will only receive events that were added to the channel before or after the last event seen. In REST terminology, the channel is "resource" and the events returned to the client are a "representation" of the channel. Clients also publish events to channels.

Typically, an event published to a channel is received by all authorized clients requesting events from that channel. It is also possible restrict the messages that are sent to a particular client. For example, one embodiment prevents the delivery of events to the client that originated the event, whereas a second embodiment prevents the delivery of events to clients that are not authorized to receive them.

The embodiments described herein may be used in a similar fashion to existing event services. Nevertheless, the RESTful architecture described herein provides better scaling performance and alternative persistence strategies not easily available in the art. Examples of these advantages and persistence strategies are shown below.

This request is related to RFC 3265, the Session Initiation Protocol (SIP)-Specific Event Notification, in that it provides an extensible event notification system, RFCs 3261, 3262, 3262, 3264, 3265, 2543, 4240, and 5367 are incorporated herein in their entirety. The preferred embodiments described below are described in terms of HTTP, but SIP-based servers are highly similar to HTTP and the routing, subscription, proxying, and notification of SIP are explicitly included as supported aspects of the present disclosure, and the HTTP equivalents are known in the art. Conceptually, the event notification described herein may be considered an "event pack" as described in RFC 3266, with the event pack specialized for filesystem and event system notifications. The description herein includes HTTP-based specialization of the event system, optimized for short polling and durable events. Accordingly, the distinguishing features and associated embodying implementations of the described scalable event queuing system are the focus of the additional disclosure herein. Nevertheless, SIP-conforming event messages and dialogs are one explicitly contemplated embodiment of the system described herein.

Referring now to FIG. 1, an embodiment of an event queuing system 20 is illustrated. The event queuing system 20 includes a client 30. In a first embodiment, the client 30 is a software application written in a programming language such as, for example, Java, Python, php, C, C++, C#, Tcl/Tk, Visual Basic, or any other programming language known in the art. An alternative embodiment implements the client in a specifically manufactured hardware device. The hardware device may use a combination of software instructions running on general purpose hardware, or may use a client implemented as an ASIC or as firmware loaded onto a reconfigurable hardware device such as an EEPROM or FPGA. If necessary, the client uses an appropriate host architecture for the technology in which it is implemented. Depending on the client implementation chosen, the host architecture may be a PC running an operating system such as Microsoft Windows, Mac OS X, or Linux. A second embodiment, uses a mobile operating system such as Android, J2ME, Windows Phone, or iOS. For ease of explanation only, and not as a limitation, the client 30 (and later the plurality of clients 80) will be described in terms of computer readable medium containing executable instructions, which when executed on a processor, are used as a system or execute a method to carry out the described functionality. Nevertheless, it should be understood that the various described embodiments as well as other similar embodiments can be substituted in any subsequent description.

Referring again to FIG. 1, the client 30 is connected to a network 40. The network 40 may be a public network such as the Internet, a private network such as an internal corporate network, or a virtual private network. Different network implementations and protocols may be used; in one embodiment, the network 40 is an Internet Protocol (IP) network utilizing the Transmission Control Protocol (TCP) protocol, whereas in a second embodiment, the network uses one of a SONET, MPLS, Infiniband, FibreChannel, LTE, WiMax, any flavor of IEEE 802.11, and GPRS. For ease of explanation only, the embodiments discussed hereafter will be described in terms of a TCP/IP network.

The event queuing system 20 also includes an application server 50 connected to the network 40. The application server is equipped with hardware, software, or a hardware-software combination that allows it to receive and process requests from the client 30 over the network 40. In this embodiment, the application server 50 is a server computer housed in a data center; nevertheless, other embodiments are contemplated. In another embodiment, the application server 50 is a personal computer. A third embodiment uses a virtual machine or software component as the application server. In a fourth embodiment, the application server 30 is an identical device to that running the client 30, and is only a server by virtue of the nature of its interaction with the client 30. All embodiments discussed hereafter will be described in terms of the first embodiment, however it is understood that any of the above embodiments can be substituted.

The application server 50 is connected to a backing store 60 used to organize and store information for later retrieval. A preferred embodiment uses a storage backend that has native support for the datatypes and messages being used elsewhere in the system. For example, MongoDB and CouchDB have native support for JSON-encoded information. For high volume implementations, a preferred embodiment has a distributed commit system such that an atomic counter can be maintained across a group of related machines. A preferred embodiment for a local or mobile system, however, may use a simple embedded database or file storage facility for ease of implementation, lower power, and simpler use.

Various implementations of these preferred embodiments are contemplated. In a first implementation, the backing store 60 is a relational database, whereas a second implantation uses a non-relational database such as MongoDB, Cassandra, Redis, CouchDB, or neo4$_j$. A third implementation uses a file system or file storage facility, including local file systems (such as NTFS, ext3, or ZFS), RAIDed file systems, a distributed file system (such as Gluster, HDFS or MooseFS), or a object storage service such as OpenStack.

Another embodiment uses an external event service (such as a service based on AMPQ) as a backing store 60. In this embodiment, the actual storage is deferred to the implementation in the external event queuing system; the scalable event queuing system described here is used as a front-end for an alternative queue and provides it with a distributed, firewall and HTTP-friendly RESTful front-end. An embodiment using a separate event system as a backing store may also require a secondary storage to enable past range queries and other functionality described herein. In that case, the "live" queries are sent to or pulled from the external event queueing system and stored queries are pulled from the secondary storage. The secondary storage is implemented in the same fashion as a primary storage backend, but has reduced need for high concurrency and responsiveness.

Figure 2:
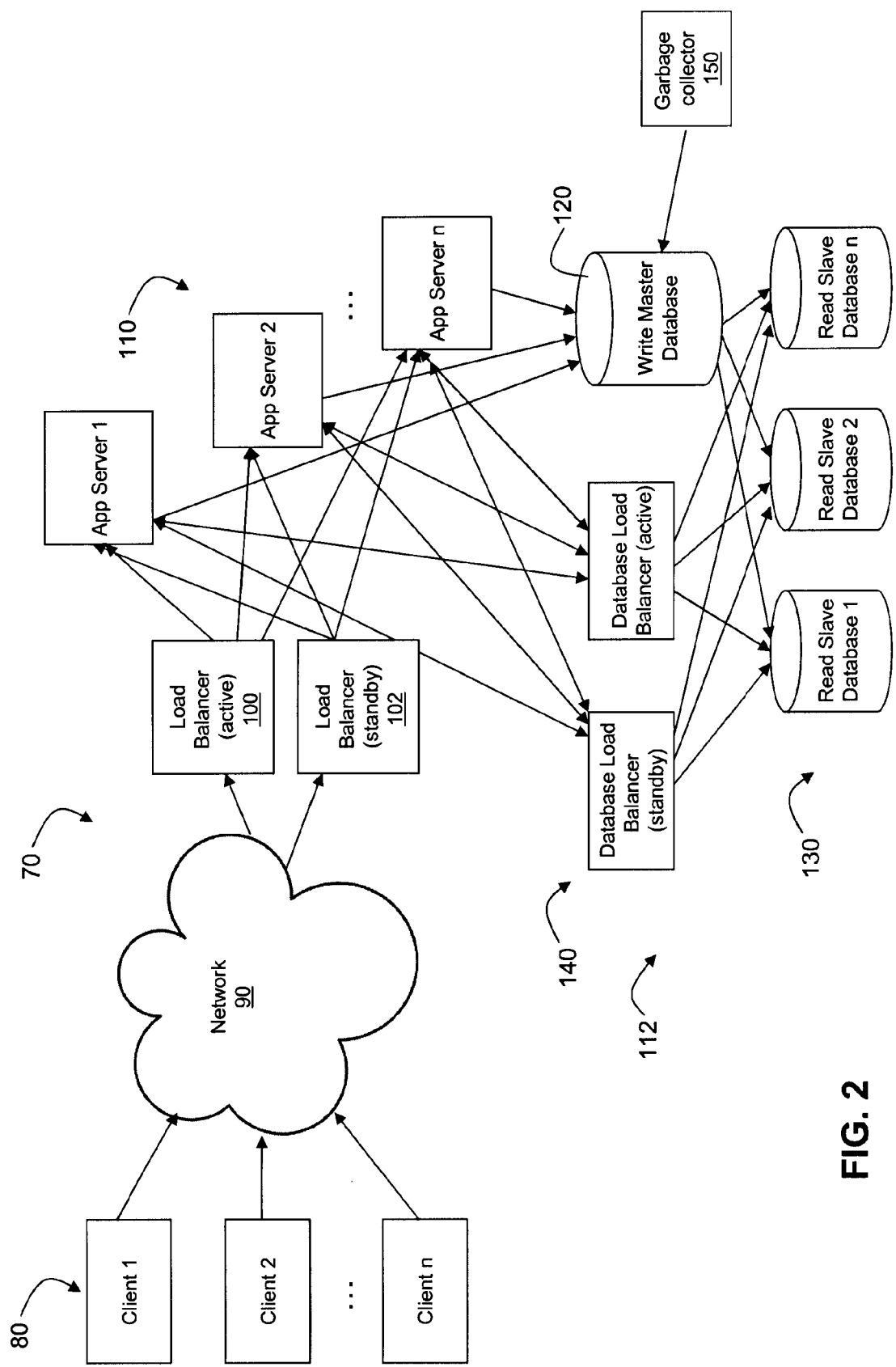
FIG. 2 is a schematic view illustrating an embodiment of a scaled event queuing and distribution system according to various aspects of the present disclosure.

FIG. 2 shows an alternative embodiment designed for higher availability and faster processing. This scaled event queuing system 70 includes a plurality of clients 80. The plurality of clients 80 are connected to a plurality of load balancers 100 over the network 90. The load balancers 100 receive requests from the plurality of clients 80 and distribute them among a plurality of application servers 110.

The scaled event queuing system 70 also includes a plurality of application servers 110. Similar to FIG. 1, the application servers 110 are connected to a backing store 112 for organizing and storing information for later retrieval. In the depicted embodiment, the backing store 112 includes a write master database 120. Requests to write data to the backing store are written to the write master database 120. In a first embodiment, the write master database 120 is a single database. In a second embodiment, a distributed or clustered datastore such as CouchDB or Cassandra is used, wherein multiple nodes can each handle writes. A third alternative embodiment uses a shared or clustered database that appears to clients as a single node, such as a MongoDB cluster.

Returning to the depicted embodiment in FIG. 2, the write master or entry point to the database 120 replicates data written to it to a plurality of read slave databases 130. Read requests may be serviced by the read slave databases 130. For greater scalability, the read slave databases 130 are fronted by a plurality of database load balancers 140. A garbage collector 150 is connected to the backing store 112. The garbage collector is used to decouple the deletion of no-longer-wanted data from each individual request; instead of actually deleting data, the system of FIG. 2 can dispatch a message to the garbage collector to recover space and perform deletions asynchronously. The garbage collector 150 is depicted as a separate entity in FIG. 2, but the separation between the backing store and the garbage collector may be only logical instead of physical. The operation of the garbage collector 150 is described in greater detail relative to the discussion of FIG. 10.

Figure 3:
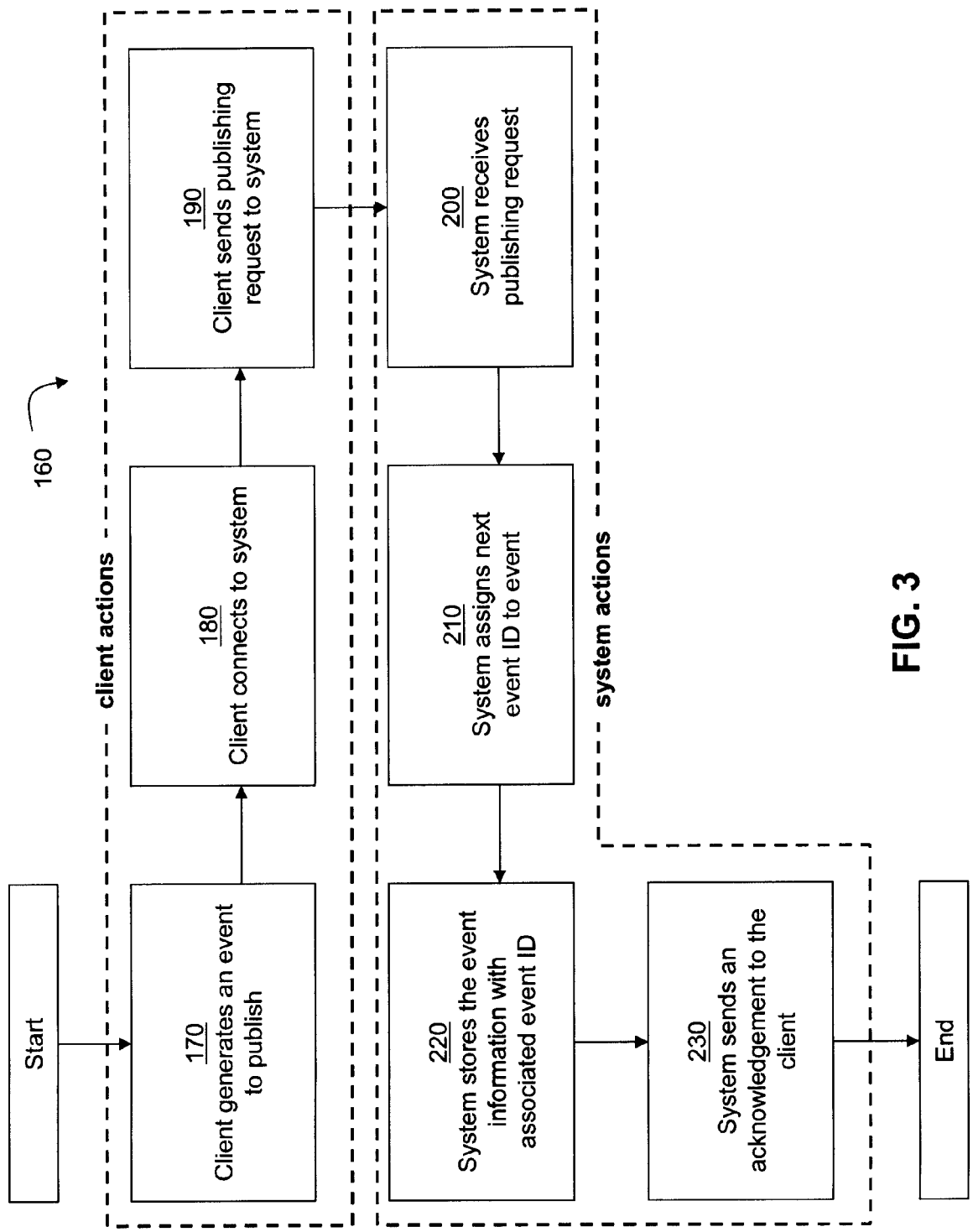
FIG. 3 is a flow chart illustrating an embodiment of an event publishing flow according to various aspects of the present disclosure.

FIG. 3 is a flow chart illustrating an embodiment of method 160 for publishing events according to various aspects of the present disclosure. The dashed lines surrounding two groups separate the actions performed by the client and server. At block 170, a client generates an event to be published. In a first embodiment, the event to be published is any information that the client desires to make known to other clients of the system. For example, one event indicates that changes have been made by the client to an open file in a distributed file system. Other clients are notified of the change by receiving the event published by the client making the change. Events can also request services or information; a second example event is a request for any type of data or information processing to occur. A client receiving the published event will perform the processing requested by it. The event will be consumed by the client receiving it and fulfilling the request meaning the event is removed from the channel after one client receives it.

In one preferred embodiment, events are not consumed when they are received by a client. In contrast to both queue-based and pipe-based event services, this embodiment maintains an event window wherein any subsequent client that connects receives the relevant events from the entire event window. An event window is defined relative to an event type, an event source, the event content. Other embodiments may dictate other types of event windows to be used to meet arbitrary needs. For example, certain events such as configuration changes, upgrade notices, software availability announcements, and operation status may have very long or infinite event windows, even if other events have different event windows.

The event generated by the client includes a resource identifier. In one embodiment, the resource identifier is a channel name, and a client requesting all events for that resource will receive a representation of all events that were published to that resource identifier. Another embodiment also includes an identifier for the client publishing the event, such as, for example, a UUID, a high precision start time stamp for the client, an IP address, a MAC address, an identifier assigned by the system when the client starts. This identifier is used by the system to avoid returning events to the client that published them, as presumably that client is already aware of the event.

The generated event is encoded in any of the following: XML, JSON, BSON, JSONP, a Javascript Array, HTML, or any proprietary or open binary or plain text protocol for transferring information.

Referring again to FIG. 3, at block 180 the client connects to the system. A preferred embodiment uses HTTPS for encryption and secure server identification, but other protocols also be used, including plain HTTP, SIP, SMTP, SPDY, SOAP, CORBA, or SMS. Alternative embodiments may be unencrypted or may use an alternative encryption method such as VPN or SSH tunneling.

For certain events, it is desirable to authenticate a client other endpoint before sending any messages. Therefore, various embodiments include an authentication mechanism such that the client must identify itself before it can publish or receive events from the system. This is accomplished through the transfer of client credentials such as, for example, an user id and password. A preferred embodiment uses HTTP basic or digest authentication over an encrypted channel. Alternative authentication methods use network addresses (e.g. IP addresses or MAC addresses) or identifiable "API keys" that are provided to clients in advance. High-security embodiments may use a second form of authentication based upon a Kerberos token, smart card, USB dongle, or other types of authentication token known in the art.

At block 190, the client sends an event publishing request to the system. In a preferred embodiment, the event is encoded as JSON as the payload inside an HTTP POST message, but alternative encodings (such as XML), URL encoded or JSONP GETs, and references to third URLs are also contemplated. For example, a request to publish an event to the channel "hello" on a system with the address "www.example.com" could be formed as follows:
POST http://www.example.com/hello/events?UUID=1234&eventinfo=token HTTP/1.1

At block 200, the system receives the event publishing request. In one embodiment, the request is received by one of a plurality of load balancers. The load balancer receiving the request determines an application server to handle the request and forwards it to that server. Alternatively, the request is received directly by an application server without first going through a load balancer. In a first embodiment, the request is forwarded through a plurality of hops between different servers before finally arriving at the application server that processes it. In a second embodiment, the request is actually processed by multiple application servers, with each server performing some portion of the processing. In a third embodiment, the event publishing request is forwarded between multiple application servers until one is found that is operational and able to process the request.

At block 210, the system assigns the next event ID to the event received in event publishing request. A preferred embodiment of the event ID uses a monotonically increasing globally unique id to identify and order events. In an embodiment using a relational database, this is easily implemented as a serial primary key of a database table for storing the events, in contrast, a sharded or distributed implementation would use an algorithmic approach to ordering, such as a vector clock, the Paxos algorithm, or a high precision timestamp plus a disambiguating ordering id requested from a central server. A keyserver or arbiter computer may be used to isolate and simplify ordering of events between many different servers and clients. If a keyserver is used, it can implement a number of different algorithms and use the algorithms in order of increasing computational complexity, stopping once an unambiguous result is found.

At block 220, the system associates the received event with the generated event ID and stores the event in storage. A typical embodiment stores the event and includes appropriate additional information such as, for example, the UUID or other globally unique ID of the client publishing the event, the time the event was published, the type of event, any context information related to the event sent in the event publishing request from the client, an expiration time, a channel name, an attribute indicating whether the event should be persistent in the queue or channel or whether it should be consumed by the first client that receives it. An alternative embodiment transforms the event to a different format and loads it into and existing event system as discussed relative to FIG. 2.

Continuing to block 230, the system sends an acknowledgement back to the client. In an HTTP-focused embodiment, the acknowledgement is an HTTP 200 OK message, although a SIP 200 response is also contemplated. A preferred embodiment also includes event system metadata with the acknowledgement back to the client. This can include the event ID assigned, the expiration time, and any other information stored with the event. The event system metadata can be encoded in JSON, BSON, XML, HTML, or a similar binary or plain text encoding scheme. In certain embodiments, the client is operable to check the status of the acknowledgement and, if event publishing failed, retry the same event publishing request.

One feature that assists with scaling the event system on the server side and preventing coordination errors is making interactions with the event system idempotent, including idempotent publishing requests. This means that the event publishing request can be repeated or retried multiple times without causing unintended side effects. Idempotency is preferred in many embodiments, but it is not an essential feature; other embodiments can take advantage of non-idempotency to create duplicate events in the channel by repeating the same request. Similarly, various embodiments will differ in the response to publishing an event to a non-existent channel. A preferred embodiment creates a new channel, but other implementations may protect parts or all of the URL space to guard against unauthorized channel creation. In such an embodiment, publishing an event to a non-existent produces an error.

Figure 4:
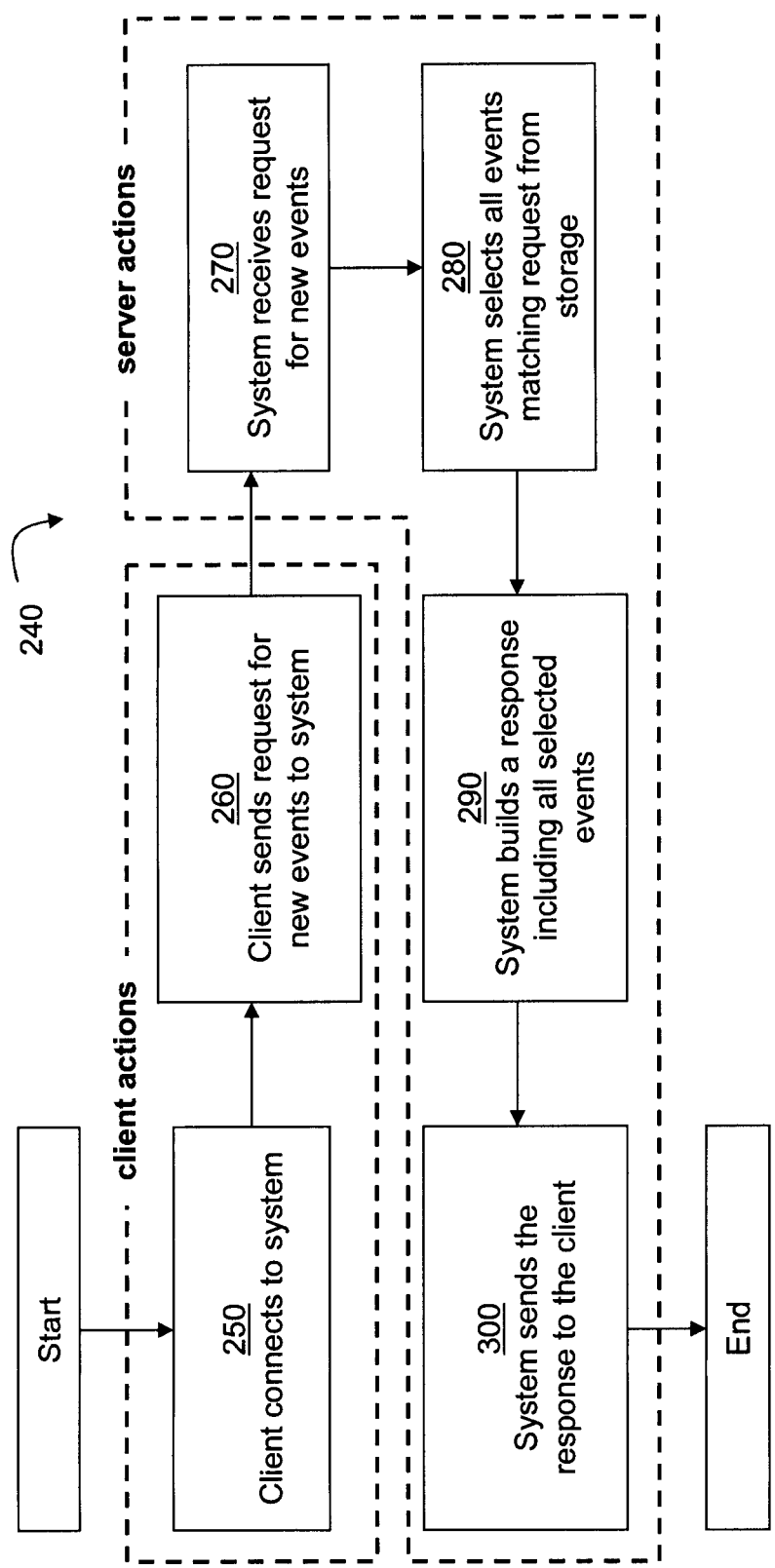
FIG. 4 is a flow chart illustrating an embodiment of an event request flow according to various aspects of the present disclosure.

Referring now to FIG. 4, a flow chart illustrating an embodiment of a method 240 for requesting events according to various aspects of the present disclosure. At block 250, the client connects to the system. In some embodiments, this connection occurs according to one or more of the methods and techniques discussed relative to block 180 of FIG. 3. Continuing to block 260, the client sends a request for new events from the system. In a first embodiment, this request is an HTTP GET request with the parameters of the request encoded as part of the request URL. For example, a request for all events from channel "system" on a system with the address www.example.com could be formed as follows:

GET http://www.example.com/system/events HTTP/1.1

A typical embodiment will define a default response type, but a client may request an alternative response type by setting an Accept header specifying the preferred type of response.

Another embodiment requires that the client that wants to create and/or receive events on a particular event queue constructs a SUBSCRIBE request with at least one body, whose disposition is type "event-channel" and include a "channel-subscribe" option-tag in a Require header field. In this embodiment, the client builds the rest of the SUBSCRIBE request following the rules in RFC 3265.

If a SUBSCRIBE request is used, it should contain an "Expires" header, the value of which indicates the duration of the subscription. In order to keep subscriptions effective beyond the duration communicated in the "Expires" header, subscribers need to refresh subscriptions on a periodic basis using a new SUBSCRIBE message. If no "Expires" header is present in a SUBSCRIBE request, the implied default is configurable according to the server, but 900 seconds is recommended as a default.

If the server needs to respond to a SUBSCRIBE request, the 200-class response contains an "Expires" header. The period of time in the response may be shorter but will not be longer than specified in the request. The period of time in the response is the one which defines the duration of the subscription.

Accept headers or request parameters are also used to request a variety of different modifications of the response. For example, either the request parameters or a specialized request header can include a last seen event ID. In a SIP-conforming embodiment, the Identification of events requested and the modification of the response provided is provided by three pieces of information—the request URI, the requested event type, and optional message body. In contrast to the SIP specification, however, the preferred embodiment implicitly includes all event types, so no particular event type notification is needed. The responding server uses the last seen event ID to determine which events to return to the client in response to the request. For example, the system can be configured to return the last event in the particular channel, all events that have occurred in the channel since that last seen event ID, or a range of events specified over either the event identifiers or particular timeframes. A preferred embodiment uses Range headers to set the appropriate range and specify the appropriate units.

In a preferred embodiment, the request can also explicitly request a particular single past event, set of past events, or range of past events. The idempotency of the request allows clients from different times to repeat these backward-looking requests and receive a suitable response over a long period of time. The backward-looking requests are specified using a separate identifier indicating the range of events, a list of event IDs, a timestamp and interval indicating a period in the past, a UUID of a client from which all events am desired, and various other mechanism of identifying events to return. These requests can be combined, for example by also including in the request a channel name indicating the channel from which the client is requesting events. If request does not contain a channel name, the system returns all matching events regardless of the associated channel.

In block 270, the system receives the request for new events from the client. This step is similar to block 200 of FIG. 3, and therefore the various embodiments and configurations described in relation to block 200 are also applicable here. For the sake of clarity and brevity, the descriptions will not be repeated. In block 280, the system selects all events from storage matching the parameters of the request. The particular implementation of this step depends upon the underlying infrastructure of the storage. For example, an embodiment using a relational database executes a SQL query selecting all events matching the request parameters. For a plain request without further parameters, the SQL query selects all events on the channel where the event ID is greater than the last seen event ID from the request, the channel name matches the channel name of the request, and the UUID that published the event does not match the UUID sent in the request. Other embodiments using alternative datastores use the native querying capabilities of the selected datastore.

In block 290, the system builds a response including the selected events. In one embodiment, the response is an HTTP 200 OK response message with a JSON document as payload containing a description of all application events. Alternatively, the response is formatted according to any binary or plain text protocol known in the art, and the events are described in any of the following: a Javascript array, an XML document, an HTML document, a serialized data structure (e.g. a pickled Python object), or any other plain text or binary data representation. In block 300, the system sends the response built in block 290 to the client. The content of the events depends on what has been sent to the system. For example, in an embodiment using the event system to coordinate filesystem events, the events correspond to notifications provided by the inotify Linux system call or equivalent structures determined on other operating systems, or by polling.

Figure 5:
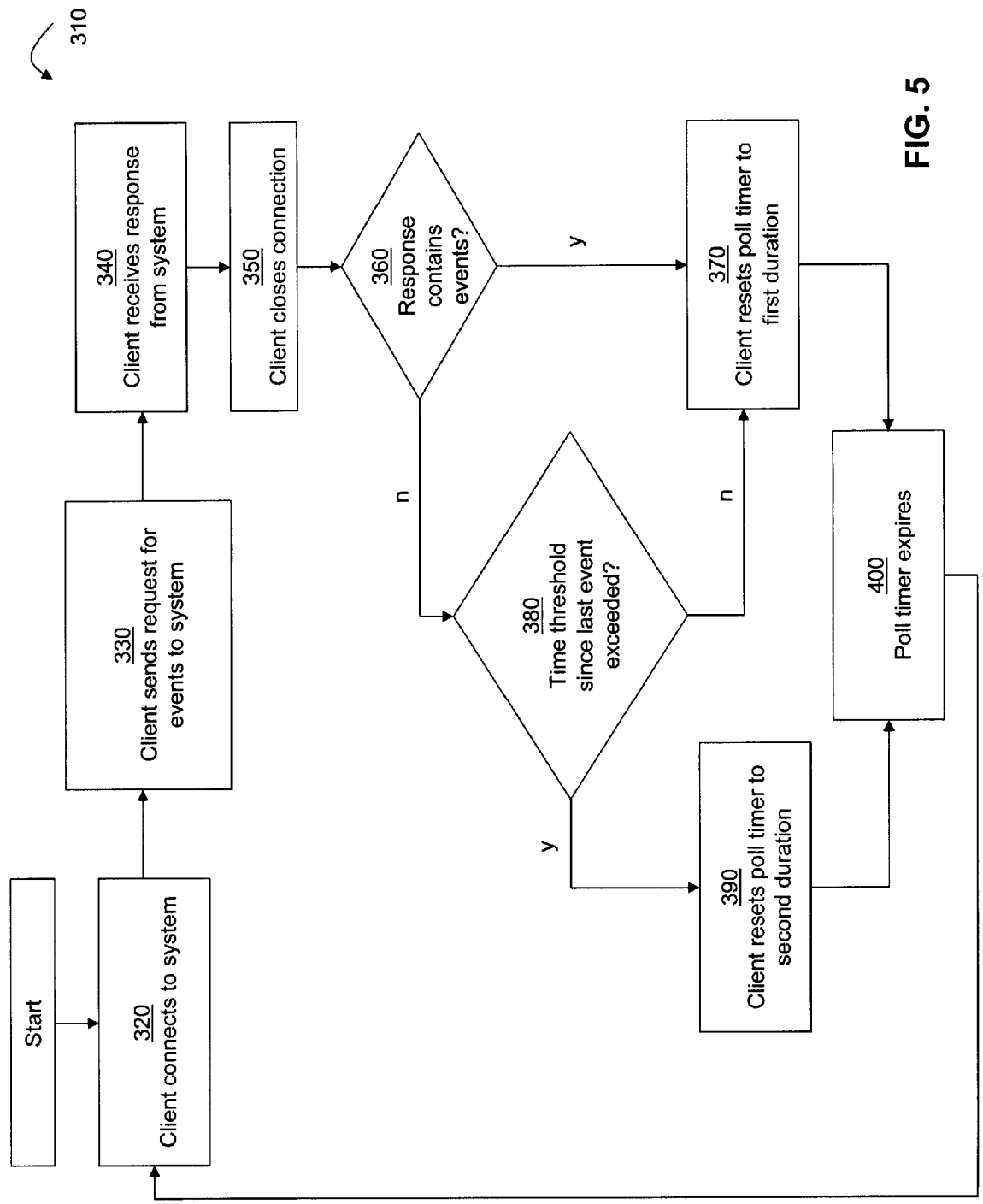
FIG. 5 is a flow chart illustrating an embodiment of a method for variable polling according to various aspects of the present disclosure.

Referring now to FIG. 5, a flow chart Is shown illustrating a method 310 of variable polling according to various aspects of the present disclosure. The depicted preferred embodiment uses short polling, where the client connects at regular intervals, receives an immediate response even if no events are present, and then disconnects for a period of time before polling again. An alternative embodiment may use long polling via BOSH, HTTP server push, websockets, Comet, or a non-HTTP-based technique such as COBRA. In such embodiments, the client remains connected to the system in a waiting state until an event arrives.

In blocks 320, and 330 the client connects to the system, sends a request for events to the system, and receives a response from the system. These steps are similar to blocks 250 and 260 of FIG. 4, and therefore the various embodiments and configurations described in relation to those blocks are also applicable here. For the sake of clarity and brevity, the descriptions will not be repeated. In block 340 the client receives a response from the system. In block 350 the client closes the connection to the system. In decision block 360, the client checks the response for events by parsing the payload of the response to determine whether it contains any encoded events. This can also be communicated more succinctly by using an HTTP status code of the message to indicate whether the message contains events. If the response does not contain any events, the method continues to block 380, where the system performs another check to see if the time since the last event was received is greater than a certain threshold. The threshold is not exceeded, the method continues to block 390, where the client sets a poll timer for a first duration. If it is exceeded, the method continues to block 390, where a poll timer is set for a second duration. In an embodiment, the first duration is less than the second duration. In a second embodiment, the first duration is greater than the second duration. In another embodiment, the durations are equal.

Referring back to decision block 360, if the response does not contain events, the method continues to block 370, where the client sets a poll timer for the first duration. After a certain amount of time, the poll timer expires (block 400) and the method proceeds back to block 320 and repeats.

In certain embodiments, the criteria examined at block 360 are varied. For example, the poll timer duration is altered in response to the total number of clients connected to the system, or due to an explicit instruction from the system contained in the received response or in a separate message.

For example, one embodiment using the event system as a filesystem event synchronization system dynamically varies the polling time based upon the number of clients watching a particular account. When a single client is active on a particular account, within a particular directory, or with a particular file, the polling time can be set at a relatively long time, such as 30 seconds or one minute, because there are presumably only one client active.

In this embodiment, a second client connecting to the server on the channel begins by sending a "hello" event announcing its presence. The server responds by returning the last set of changes since the last seen event ID, allowing the new client to synchronize. The hello message is also sent down as an event of interest to the first client. As soon as a second client is active within the particular region if interest, either client can increase the rate at which it polls for changes independently. This allows for local control of the polling rate based upon local knowledge of the activity surrounding the area of interest, without a direct command-and-control relationship between the server and the clients.

In this embodiment, the polling time for receiving new events and for receiving old events can be asymmetric. New changes can be sent via a properly formatted GET or POST on an as-needed basis. Periodic polling for new information can take place only when there has been a sufficient time between the last event posting and the current time. For example, when there are no new events to be distributed or when only one client is attached, the server conserves resources by only responding with a status response such as 204 No Content. When the server has more information to send to a client, a full 200 OK with a response indicating new events can be returned.

Figure 6:
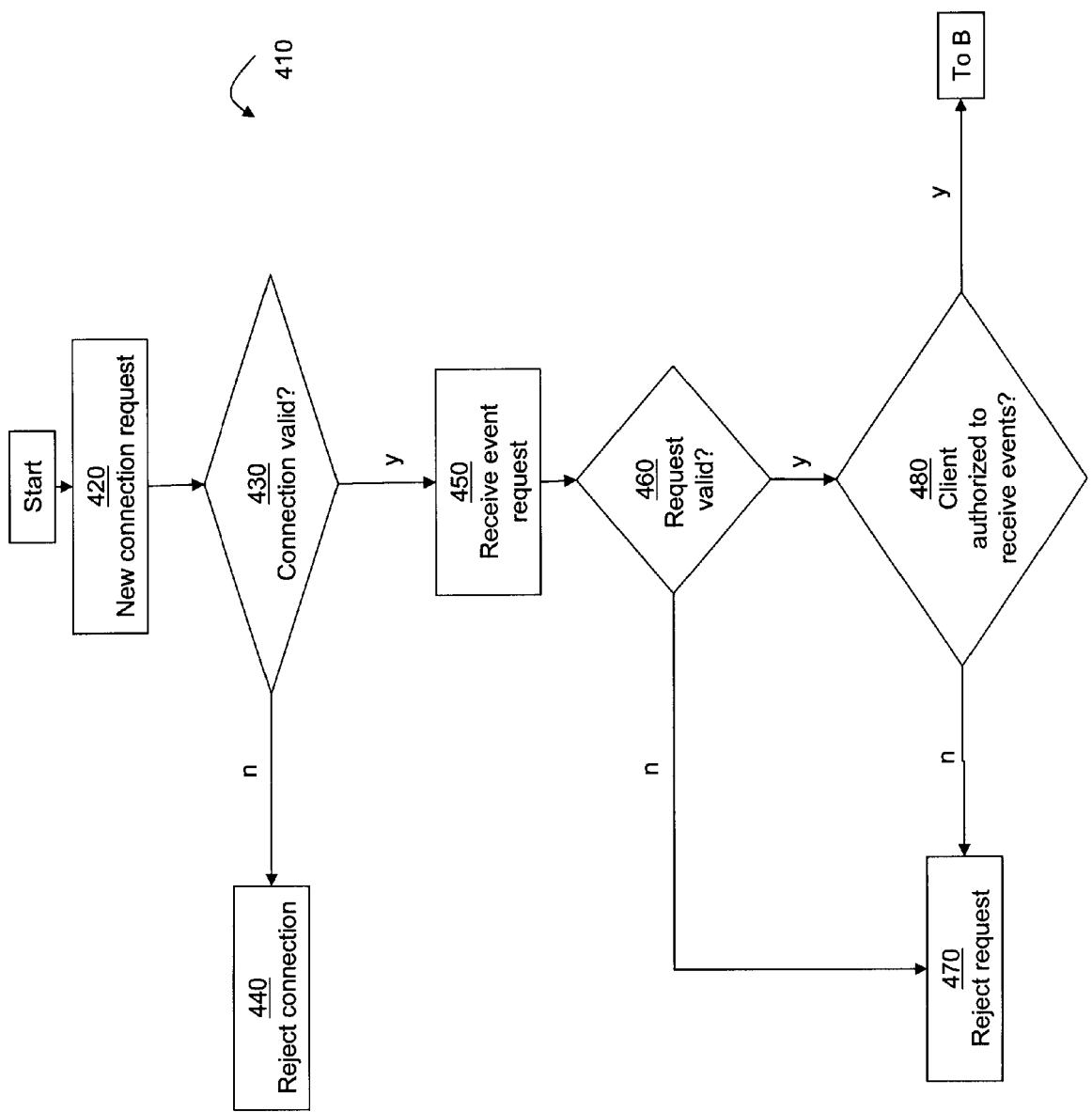
FIG. 6 is a flow chart illustrating an embodiment of method of processing an event request according to aspects of the present disclosure.

Referring now to FIG. 6, a flow chart is shown illustrating an embodiment of a method 410 of processing an event request according to aspects of the present disclosure. At block 420, the system receives a new connection request from a client. At block 430, the system performs a check to determine whether the connection is valid. A preferred embodiment includes validation at both the protocol level as well as at the content level. For example, a preferred embodiment the system checks to see if the connection is made in conformance with the HTTPS protocol and using a valid certificate, checks whether the connection is originating from an approved device, address, or range of addresses, and checks whether the authorization information sent with the connection request, such as a username and password, is valid. Various requests may require less checking—for example, a "STATUS" request may not require HTTPS, IP validity checking, or a username and password. Other embodiments may use certificates, keypairs, content hashes, and other types of validity checks.

If the system determines that the connection is not valid, the method 410 continues to block 440 where the system rejects the connection. Rejecting the connection can occur at layer 3, for example by sending a TCP RST or FIN packet back to the client, or at layer 7, by sending a message such an HTTP 400-series return code indicating that the connection request has been rejected. For debugging or visibility purposes, the rejection message may includes an indication of the reason for the rejection.

If the system finds that the connection is valid, the method 410 continues to block 450, where the system receives the event request sent by the client as previously described in block 270 of FIG. 4. At block 460, the system checks whether the request received from the client is a valid request. The distinction between the step at block 430 and the step at block 450 is that the step at block 430 checks for a valid connection and the step at block 450 checks that a semantically valid request was received over the connection. For example, in an embodiment using JSON-encoded events, this check involves parsing the body of the message to ensure that it contains a valid JSON document. A preferred embodiment checks not only the syntax of the request, but also the semantic validity of the request by ensuring that the parameters included in the message or valid. For example, the system checks that the last seen event ID included with the request is a valid event ID and that the UUID of the client included in the request is included in a list of authorized clients. If the request is not valid according to the check performed at block 460, the method 410 continues to block 470, where it rejects the request. In the described HTTP-centric embodiment, the system rejects the request by sending back an HTTP response with an error code, for example "404 Not Found," "405 Method Not Allowed," or "412 Precondition Failed."

At block 480, the system has determined that the connection request is valid and that the request is syntactically and semantically within bounds. The server then checks whether the client is authorized to receive events. For example, one preferred embodiment issues a UUID to each client as they register with the system. The check at block 480 involves checking whether the UUID specified in the request is allowed to receive events from the channel specified in the request. An alternative embodiment may evaluate authorization information sent in the body of the request, such as checking user credentials sent in the event request against a list of authorized users for the specified channel. Another embodiment may require an handshake between the client and server, such as a challenge and response authentication scheme. If the client is not authorized to receive events, the method 410 continues to block 470, where the request is rejected as previously discussed. If the client is authorized, method 410 continues to block B, and subsequently to block 490 on FIG. 7.

Figure 7:
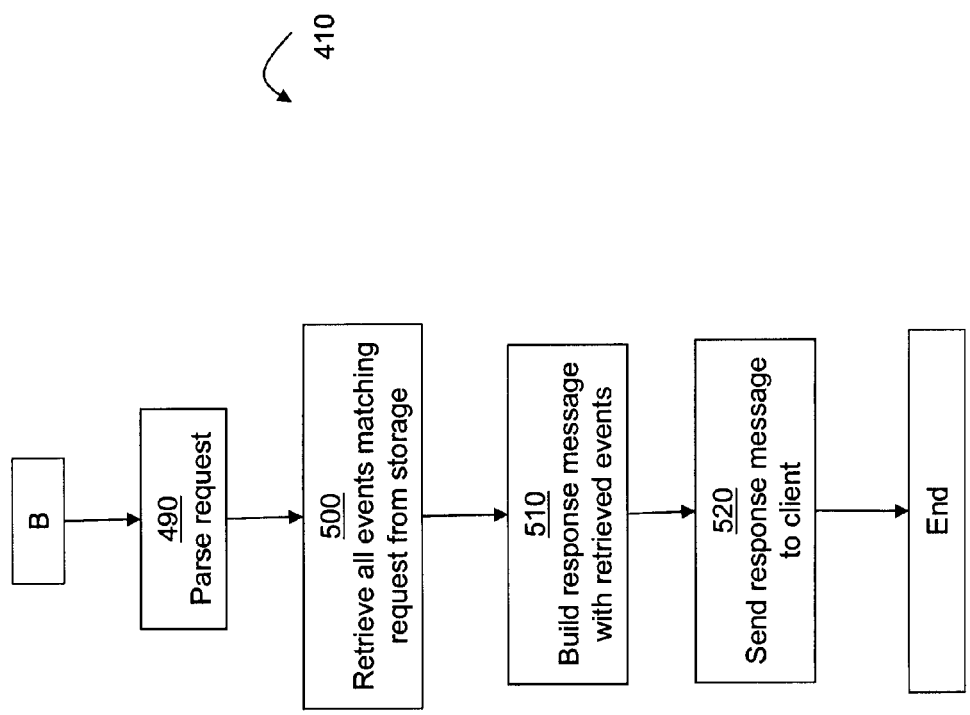
FIG. 7 is a flow chart, continued from FIG. 6, illustrating an embodiment of method of processing an event request according to aspects of the present disclosure.

FIG. 7 is a flow chart, continued from FIG. 6, illustrating an embodiment of a method 480 of processing an event request according to aspects of the present disclosure. At block 490, the request is parsed to remove the various parameters contained therein. This parsing is directed by the protocol chosen for the client server interaction. At block 500, the system retrieves all events matching the request from storage. At block 510, the system builds a response from the selected events. At block 520, the system sends the response to the client. Blocks 500, 510 and 520 are similar to blocks 280, 290, and 300, respectively, from FIG. 4, and therefore the various embodiments and configurations described in relation to those steps are also applicable here. For the sake of clarity and brevity, the descriptions will not be repeated.

Figure 8:
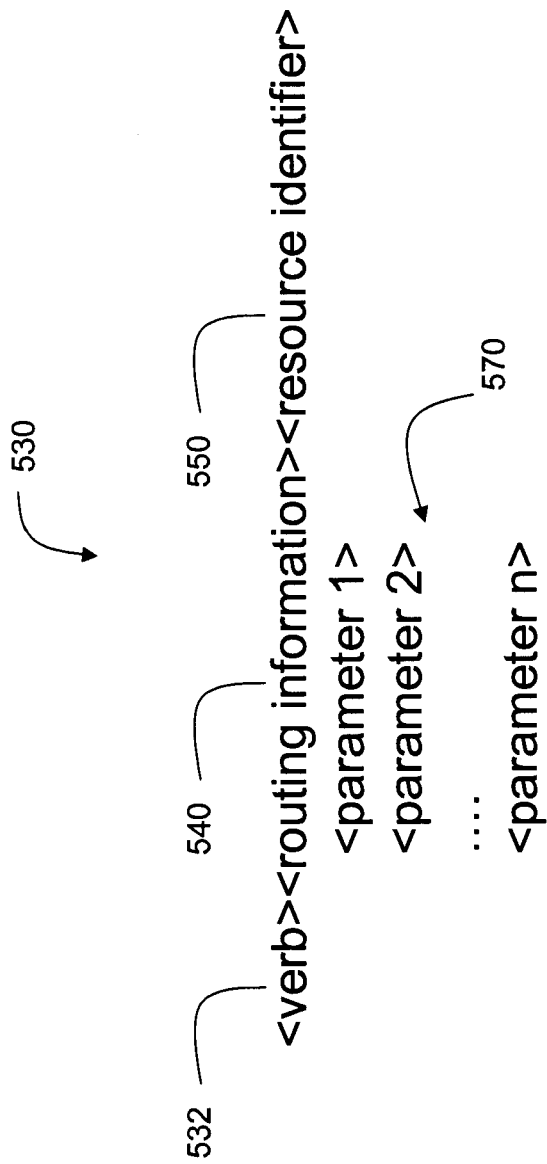
FIG. 8 is an exemplary format of an event request according to various aspects of the present disclosure.

FIG. 8 shows an exemplary format of an event request 530 according to various aspects of the present disclosure. An event request at minimum contains enough information to route the request to the appropriate entity per the request routing procedures outlined in RFC 2543. It also contains enough information to identify the resource for which event notification is desired, but not necessarily enough Information to uniquely identify the nature of the events requested. As noted above, the preferred embodiment is over-inclusive in the types of events provided and allows clients to request subsets of those events if only a subset is of interest.

Continuing with FIG. 8, the event request 530 includes a verb 532. In an embodiment, the verb 532 is one of the HTTP request types (e.g., GET, POST, PUT, DELETE). In other embodiments, the verb 532 is a SIP SUBSCRIBE message. The verb indicates the purpose of the message. For example, in an embodiment, a verb of "GET" in an HTTP request indicates that the client wishes to receive events, whereas a verb of "POST" indicates that the client wishes to publish an event. A typical embodiment primarily uses GET and POST, but the use of PUT and DELETE is also contemplated. To distinguish between accidental POSTs to new channels and the creation of a channel, a server requires a PUT request to create a channel. A DELETE message is used to indicate that either a channel should be deallocated or that a particular event is no longer valid.

The event request 530 includes routing information 540 which identifies the server or system to which the request pertains. A preferred embodiment uses a URI for the routing information, such as a domain name or IP address. An alternative embodiment can route according to a Unix domain socket, within an intra-system or intra-cluster IPC system, or according to a symbolic name. The event request 530 also includes a separator 550 between the routing information 540 and a resource identifier 560. In the preferred embodiment, the separator 550 is a forward slash ("/"). A preferred embodiment uses the URI syntax defined in RFC 3986, which is included herein by reference in its entirety.

The event request 530 also includes a plurality of parameters 570. In a preferred embodiment, the parameters 570 are encoded as a JSON document, but they may also be encoded using XML, HTML, a Javascript array, or another data exchange format. In a third embodiment, the parameters 570 convey information about the request, for example the UUID of the client making the request. In a fourth embodiment, the parameters 570 convey information about the resource the request is directed to such as the channel name.

Figure 9:
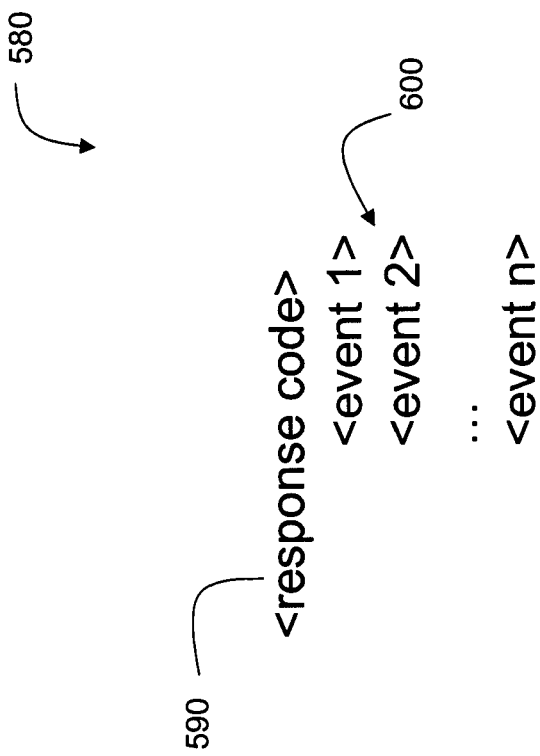
FIG. 9 is an exemplary format of an event response according to various aspects of the present disclosure.

FIG. 9 shows an exemplary format of an event response 580 according to various aspects of the present disclosure. The event response 580 includes a response code 590. In one embodiment, the response code is one of the codes defined in SIP or HTTP ("200", "404 Not Found", etc). In a second embodiment, the response code 590 is any binary or alphanumeric string that conveys the status of the response. The event response 580 also contains one or more events 600. In an embodiment, the events 600 are encoded as a JSON document. In other embodiments, the events are encoded according to any format for data encoding and transfer (e.g., XML, HTML, etc.). An alternative SIP-conforming embodiment encodes the response in a SIP NOTIFY response.

Figure 10:
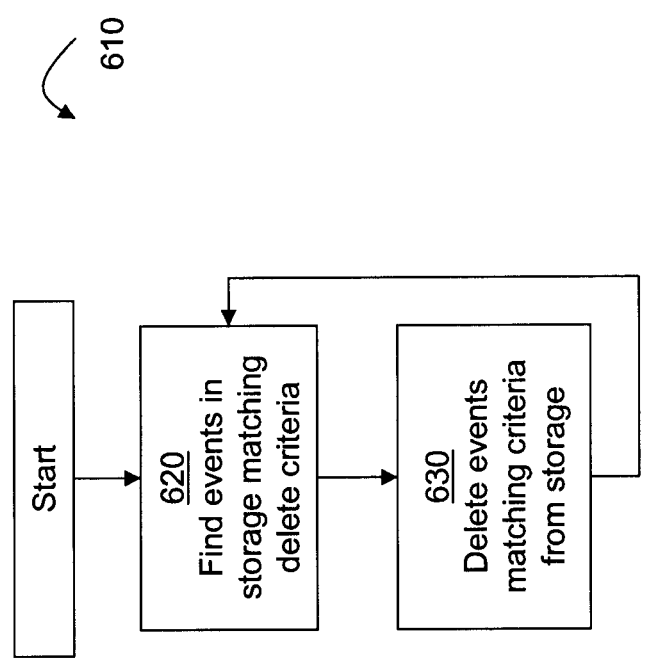
FIG. 10 is a flow chart illustrating a garbage collection method according to various aspects of the present disclosure.

Referring now to FIG. 10, a flow chart is shown illustrating an embodiment of a method 610 of garbage collecting events according to aspects of the present disclosure. The method 610 includes block 620, where the system finds all events in storage matching a delete criteria. In an embodiment, the delete criteria is defined by a "time to live" value for events in the system. For example, if the time to live was 60 seconds, all events greater than 60 seconds old would be selected in block 620. In other embodiments, the delete criteria is a maximum number of events on a channel, and after the channel reaches that size the older events begin to be deleted. In other embodiments, the delete criteria is a maximum number of events published per client. In still other embodiments, the delete criteria is a maximum number of clients to have received the event. For example, a counter on the event could be incremented each time an event is sent to a client. If the counter is greater than the maximum number, the event would match the delete criteria. At block 630, events matching the delete criteria are deleted from the storage. In an alternative embodiment, the events are marked for later deletion by a reaper process rather than deleted directly.

One advantage of some embodiments of the present invention over other solutions known in the art is the use of a RESTful interface to the event queuing and distribution functionality. Such an interface allows for ease of maintenance, scalability, and a general reduction in complexity over other types of interfaces. Another advantage to some embodiments of present invention over other solutions is the concept of persistent queuing. In many queuing applications, events are consumed by the first client to read them from the queue. While some embodiments of the present invention function in this manner, others allow events to remain In the queue for either a certain amount of time or indefinitely. This approach allows a client to receive a historical record of activity in the form of all the events that have been published to a certain channel during the current window. In some embodiments, a true historical record of all events is saved as the time to live for events is infinite.

Another advantage of various embodiments according to the present disclosure is the ability to utilize other queuing and event distribution systems as well as other data storage systems as a backing store. The system is agnostic as to the format of the backing store, and different types of backing stores including databases, external event queuing systems. This allows the RESTful interface employed by some embodiments of the present invention to be presented to clients of the system, rather than the interfaces of the individual queuing and storage systems. This allows for Increased scalability, ease of maintenance, and better system reliability. In addition, it is contemplated that many different types of backing stores could be integrated in a single system according to the aspects of the various disclosure.

Figure 11:
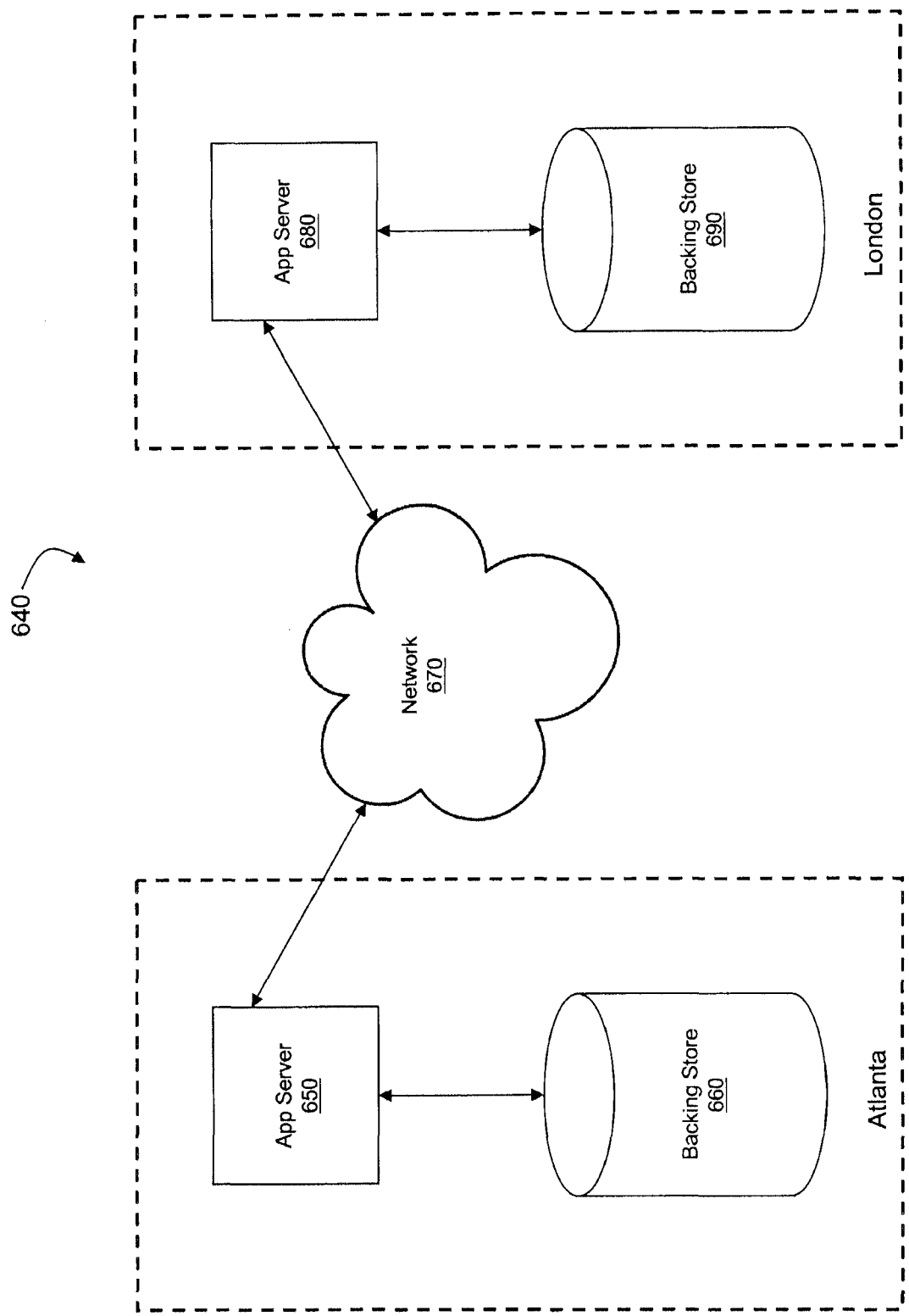
FIG. 11 is a block diagram illustrating an embodiment of an application server coupled to another application server over a network.

FIG. 11 is a block diagram 640 illustrating an embodiment of an application server coupled to another application server over a network. An application server 650 is coupled to a backing store 660. Application server 650 and backing store 660 are illustrated as located in Atlanta. An application server 680 is coupled to a backing store 690. Application server 680 and backing store 690 are illustrated as located in London. Application Server 650 is coupled to application server 680 over network 670.

Another advantage of various embodiments described is the optional use of a SIP-conforming embodiment such that existing SIP servers can be used for message proxying, routing, and responding. The disclosure herein extends the event notification procedure in SIP, previously only used for presence, status, and similar person-to-person interaction, into the realm of filesystem modification notification. The implementation of presence from existing SIP event packs can be used to modify the notification procedure to increase or decrease event notification frequency when different clients are "present" in the same filespace and may have overlapping requests for modification to a file.

A final advantage of various embodiments is the porting of SIP-style event notification into pure HTTP, allowing for the use of common HTTP routing and scalability infrastructure. A SIP proxy can be used to translate between SIP events and HTTP events as described in the present disclosure, allowing for easier event traversal over firewalls and across systems.

The above disclosure refers to specific exemplary embodiments of the present invention which are provided as examples only and not intended to limit the scope of the present disclosure. Further, additional configurations involving substituting, omitting, or rearranging certain components from the various embodiments are also contemplated by the present disclosure and do not depart from its scope.

The invention claimed is:

1. An event distribution system, the system comprising:
   a server configured to respond to event requests via a synchronous client-server protocol, the server further including:
      a backing store configured to store a first event associated with a first channel identifier and to allow subsequent retrieval of the first event using the first channel identifier, wherein the first event is associated with a first event identifier;
      a communications module operable to receive event requests and send responses to the event requests, wherein the communications module receives from a client an event request including a second event identifier and an interval indicating a period in the past, wherein the first event was added to the first channel before a second event associated with the second event identifier was added to the first channel;
      an event filtering system operable to evaluate, modify, and block event requests and responses, wherein in response to the event request, the event filtering system sends a response including one or more events satisfying the interval, wherein the one or more events includes the first event, but not the second event, and wherein the response includes one or more events that were added to the first channel since the second event was added to the first channel, wherein a third event was added to the first channel after the second event, and the response includes the third event; and
      an event manager coordinating the use of the backing store, communications module, and event filtering system, wherein the event manager uses the event filtering system to block a recording of one or more first requests in the backing store and to block the sending of the one or more first requests via the communications module, wherein the first request is identical to the event request;
   wherein the event requests represent interactions with a distributed filesystem storage system.

2. The event distribution system of claim 1, wherein the synchronous client-server protocol is one of HTTP, HTTPS, and SIP.

3. The event distribution system of claim 1, wherein the channel identifier is a URI.

4. The event distribution system of claim 1, wherein the event requests are formatted as one of HTTP POST, HTTP PUT, HTTP GET, and SIP NOTIFY.

5. The event distribution system of claim 1, wherein the event manager uses the event filtering system to identify a set of essential parameters that characterize a request, the set of essential parameters including a channel identifier; and wherein every request including identical parameters returns an identical response via the communications module.

6. The event distribution system of claim 5, wherein the set of essential parameters includes a temporal range; and wherein a request with identical parameters includes a request made within the defined temporal range.

7. The event distribution system of claim 1, wherein after the first event was added to the first channel, the client subscribed to the event filtering system to receive events.

8. A method comprising:
   storing in a backing store a first event associated with a first channel identifier, the backing store enabling subsequent retrieval of the first event using the first channel identifier, and the first event being associated with a first event identifier;
   receiving an event request including a second event identifier and an interval indicating a period in the past, the first event being added to the first channel before a second event associated with the second event identifier was added to the first channel;
   in response to the event request, sending a response including one or more events satisfying the interval, wherein the one or more events includes the first event, but not the second event, and wherein the response includes one or more events that were added to the first channel since the second event was added to the first channel, wherein a third event was added to the first channel after the second event, and the response includes the third event;
blocking a recording of one or more first requests in the backing store, wherein the first request is identical to the event request; and
blocking sending of the one or more first requests.

9. The method of claim 8, wherein the sending a response includes responding to the event request via a synchronous client-server protocol.

10. The method of claim 9, wherein the synchronous client-server protocol is one of HTTP, HTTPS, and SIP.

11. The method of claim 8, wherein the receiving an event request includes receiving an event publishing request, wherein the event publishing request includes an event publishing verb and a subject, wherein the event publishing request is transmitted using one of HTTP and HTTPS, and wherein the event publishing verb is one of POST and PUT.

12. The method of claim 8, wherein the channel identifier is a URI.

13. The method of claim 8, wherein the sending a response includes sending a representation of the one or more events.

14. The method of claim 13, wherein the representation of the one or more events is encoded in a format selected from the group consisting of a Javascript array, JSON, BSON, XML, HTML, and plain text.

15. The method of claim 8, wherein after the first event was added to the first channel, the client subscribed to the event filtering system to receive events.

16. The method of claim 8, wherein the sending a response includes sending one or more events that were added to the first channel since the second event was added to the first channel, wherein a third event was added to the first channel after the second event, and the response includes the third event.

17. A non-transitory machine-readable medium comprising a plurality of machine-readable instructions that when executed by one or more processors are adapted to cause the one or more processors to perform a method comprising:
storing in a backing store a first event associated with a first channel identifier, the backing store enabling subsequent retrieval of the first event using the same first identifier, and the first event being associated with a first event identifier;
receiving an event request including a second event identifier and an interval indicating a period in the past, the first event being added to the first channel before a second event associated with the second event identifier was added to the first channel;
in response to the event request, sending a response including one or more events satisfying the interval, wherein the one or more events includes the first event, but not the second event, and wherein the response includes one or more events that were added to the first channel since the second event was added to the first channel, wherein a third event was added to the first channel after the second event, and the response includes the third event;
blocking a recording of one or more first requests in the backing store, wherein the first request is identical to the event request; and
blocking sending of the one or more first requests.

* * * * *